United States Patent

Krautkremer

[11] 3,930,458
[45] Jan. 6, 1976

[54] PROPELLER SUPPORT FOR AMPHIBIOUS VEHICLE

[75] Inventor: Franz Krautkremer, Spay (Rhine), Germany

[73] Assignee: Schottel-Werft Josef Becker KG, Spay (Rhine), Germany

[22] Filed: Oct. 4, 1972

[21] Appl. No.: 294,799

[30] Foreign Application Priority Data
Nov. 17, 1971 Germany............................ 7143323

[52] U.S. Cl.............................. 115/1 R; 115/41 HT
[51] Int. Cl.²............................................. B63H 5/12
[58] Field of Search ............ 115/1 R, 1 B, 34 R, 35, 115/41 R, 41 HT, 18 R, 18 A, 18 E

[56] References Cited
UNITED STATES PATENTS

| | | | |
|---|---|---|---|
| 2,336,906 | 12/1943 | West | 115/1 R |
| 2,458,813 | 1/1949 | Wanzer | 115/41 R |
| 2,536,894 | 1/1951 | Wanzer | 115/41 R |
| 2,902,967 | 9/1959 | Wanzer | 115/41 R |
| 3,072,090 | 1/1963 | Yarbrough | 115/35 |
| 3,385,255 | 5/1968 | Raymond et al. | 115/1 R |
| 3,487,802 | 1/1970 | Roy | 115/1 R |

*Primary Examiner*—Trygve M. Blix
*Assistant Examiner*—Douglas C. Butler
*Attorney, Agent, or Firm*—Woodhams, Blanchard and Flynn

[57] ABSTRACT

An amphibious vehicle, normally of tracked land drive, having outboard drive device tiltable for removal from drive position when not in use. There is provided a self-contained water drive device comprising a motor and propeller unit which is tiltably mounted at the stern of the vehicle, the tilting being either longitudinally or transversely as desired. Power and latch devices are provided for tilting and holding the water drive device out of operating position. Other latch structure is provided including automatic control if desired, for holding the water drive device in operating position.

12 Claims, 5 Drawing Figures

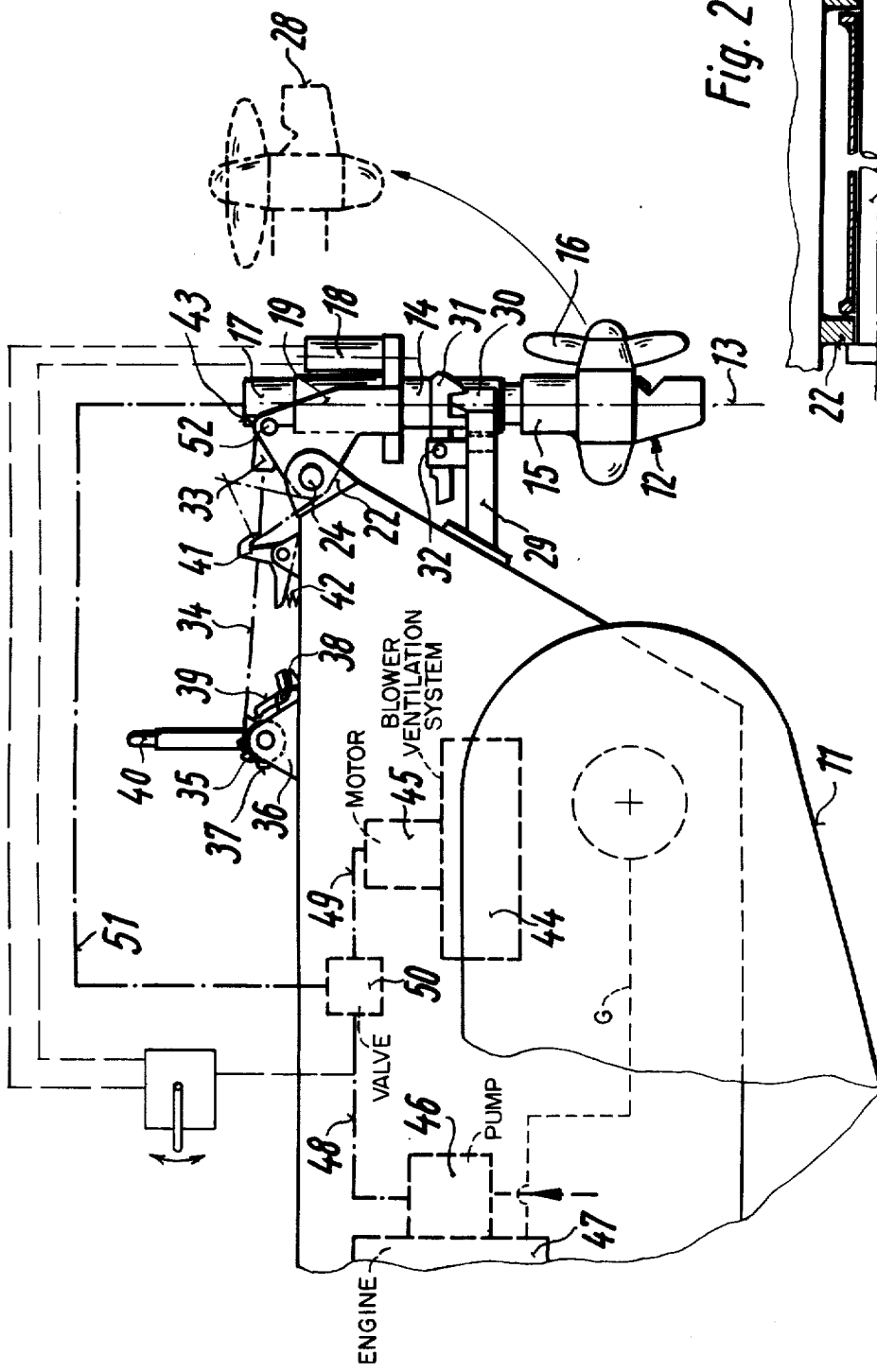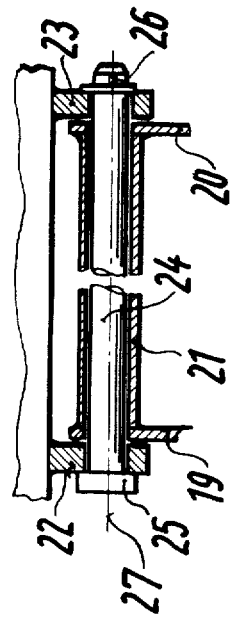

PROPELLER SUPPORT FOR AMPHIBIOUS VEHICLE

FIELD OF THE INVENTION

The invention relates to an amphibious vehicle having drive means for traveling on land.

BACKGROUND OF THE INVENTION

The invention is intended for cross-country vehicles which are to be capable of traversing waters of such depth that the undercarriage provided for use on land can no longer be used. Such a vehicle may also be a movable construction machine, a dredge or the like. In a narrow sense, the basic purpose of the invention is to provide such a vehicle with a drive for traveling on water. Nevertheless, the vehicle is so constructed that during a longer period of operation on land, wherein travel through deep waters does not take place, it is not hindered by a drive for the water travel. On the other hand, the water drive will provide the vehicle with a high maneuverability.

The basic purpose of the invention is attained by providing at least one power-driven steerable propeller which at least in its operating position is pivotable about an approximately vertical pivot axis through approximately 180° or more and is tiltable about an approximately horizontal tilting axis and which is driven by a motor in addition to the drive of the land vehicle. The pivotability provides the vehicle during travel in water with a high maneuverability and by means of the tiltability the steerable propeller can be adjusted during travel on land in such a manner that it is not damaged during cross-country travel, such as during travel over pathless grounds or over slopes.

The invention has particular importance for tracked vehicles, or stated in other words, since tracked vehicles are particularly suitable for cross-country travel, a water drive according to the invention is particularly important for them.

In consideration of the above-described purpose, the water drive forms a unit which is as self-contained as possible. Thus, the steerable propeller consists substantially of a first portion which is nonpivotable about the pivot axis and of a second portion which is pivotable about the pivot axis and carries the propeller and the motor is arranged on the nonpivotable portion. In particular, it is advantageous if the steerable propeller is releasably connected to the vehicle, this being particularly advantageous because the water drive can be removed entirely if it is to be expected that it will not be needed for a long period of time.

Various embodiments can be used to carry out the invention. In one embodiment the tilting axis is arranged transversely to the direction of travel through which the steerable propeller can be tilted outwardly in an astern direction. In a different embodiment, the tilting axis is arranged parallel to the direction of travel, which can be particularly advantageous inasmuch as the upwardly tilted steerable propeller does not project astern and thus possibly interfere during turning or travel over slopes. It is also possible to continue the driving of the steerable propeller during the tilting process so that it can produce a forward movement during the tilting or in partially upwardly tilted condition. In other embodiments, the tilting axis is arranged three-dimensionally between the stated positions so that the steerable propeller can be tilted, for example, both laterally and rearwardly.

The steerable propeller is particularly simple to mount if a pivot pin is provided in the tilting axis, which pin connects the land vehicle and the first portion of the steerable propeller and which can be dismounted or secured in installed condition as desired.

Further, for good maneuverability a desirable construction provides a remotely operable motor for the pivoting movement of the second portion of the steerable propeller.

In order to carry out the tilting movement quickly and safely, a preferred embodiment provides a mechanical, electrical, hydraulic or pneumatic drive mechanism for effecting the tilting movement. The electric drive can consist of an electric motor which cooperates with a suitable screw. The hydraulic or pneumatic drive consists advantageously of at least one cylinder-piston unit. A crank can be provided for the mechanical drive.

A simple and strong drive for the tilting movement is obtained by hinging to the first portion suitable pulling means, for example a chain or cable, and by supporting a drum or the like on the land vehicle, on which drum the pulling means can be wound.

It is advantageous particularly also during land drive if an involuntary backward driving is prevented by a releasable latch. Furthermore it is advantageous if in place of the crank there is provided a lever which acts through a one-way coupling, thus for example through a latch, onto the drum, which lever also acts as a catch for the drum. This type of manual operation is particularly simple and sturdy.

A bracket or the like provides further safety of operation if said bracket connects the steerable propeller additionally to the vehicle in operating position. In order that the steerable propeller can be both secured and released quickly, the new device is advantageously provided with a latch lock on the mounting.

Particularly advantageous in this connection is also a remotely operable motor for the latch lock, which can be driven, for example, hydraulically or pneumatically.

In order to relieve the tilting movement drive from the load while in rest position, and to secure the steerable propeller in upwardly tilted condition, the new device is advantageously provided with a locking device which connects the steerable propeller, when same is tilted from the operating position, releasably to the vehicle.

It is desirable for the best economy to fit the apparatus into the vehicle so that the energy supply for the blower or the blowers of the vehicle is switched over to the drive for the propeller. It is also possible to use this energy for driving the tilting procedure and for pivoting the steerable propeller for the purpose of the steering.

Further advantages and characteristics of the invention can be taken from the following description. The description in general refers only to a single steerable propeller but the invention also includes the use of multiple steerable propellers.

BRIEF DESCRIPTION OF THE DRAWINGS

The invention is discussed in connection with some exemplary embodiments which are illustrated in FIGS. 1 to 5, in which:

FIG. 1 schematically illustrates an exemplary embodiment with a steerable propeller which can be tilted in astern direction;

FIG. 2 illustrates a detail of FIG. 1;

DETAILED DESCRIPTION

Figure 3:
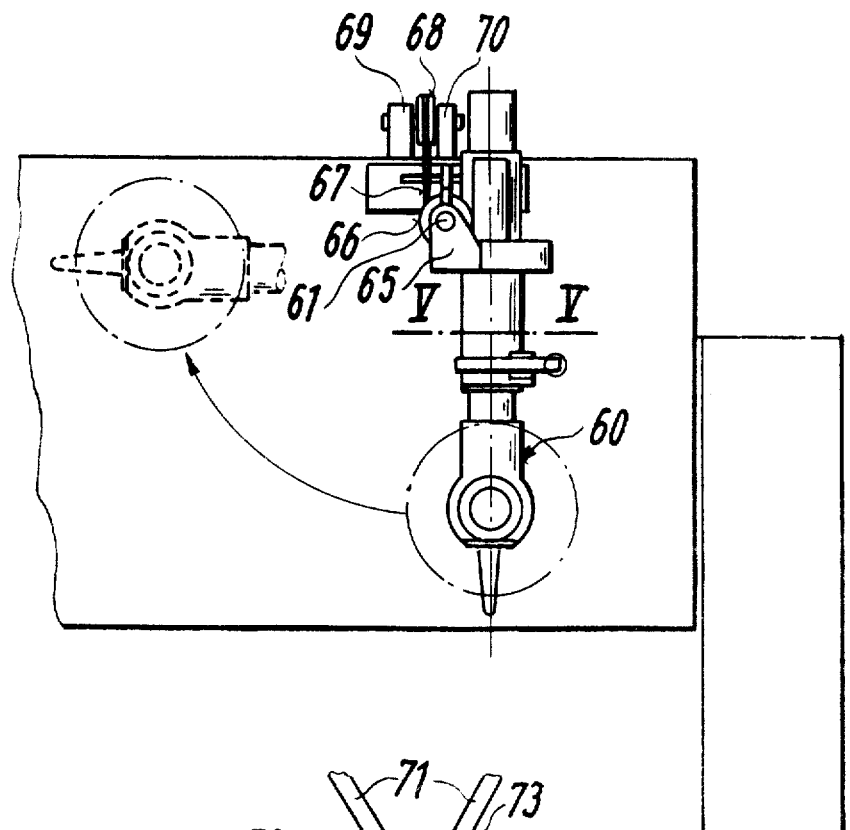
FIG. 3 schematically illustrates an exemplary embodiment with a laterally upwardly tiltable steerable propeller.

FIG. 1 schematically illustrates from the side the rear portion of an amphibious vehicle, which vehicle is carried and moved by a tread drive G driven by the main motor 47. In deep water this vehicle is driven by a steerable propeller 12 which can be pivoted about a pivot axis 13 for the purpose of controlling the vehicle. The steerable propeller consists substantially of a first portion 14, which can be secured nonpivotably on the machine embodying the invention and of a pivotable second portion 15 which carries the propeller 16. The propeller is driven by a motor 17 which is arranged on the nonpivotable first portion and which transmits its torque to the propeller through known and therefore not illustrated gear elements. For the pivoting for the purpose of steering, the second portion can be driven by the conventionally driven and controlled servomotor 18. The servomotor is also arranged on the first portion.

The first portion is provided with a pair of flanges 19, 20 which are connected by a sleeve 21 (FIG. 2). Two bearing blocks 22, 23 are secured at the rear of the vehicle and horizontally spaced so that they can receive the flanges with the sleeve therebetween. The bearing blocks, the flanges and the sleeve are provided with coaxial openings for reception of a pivot pin 24. The pivot pin is provided with a head 25 on one side and on the other side with a transverse bore 26 through which a cotter pin or other fastening can be placed. By this pivot pin the steerable propeller is releasably connected to the vehicle. When the steerable propeller is mounted, the pin can be secured with the fastening means, such as the cotter pin above mentioned. The steerable propeller can be tilted upwardly in astern direction about the axis 27 of the pin 24, so that thereby, for example, a tilt angle of 90° is obtained and the steerable propeller assumes an approximately horizontal position, as is illustrated with dashed lines in FIG. 1 and identified with 28. The entire axis 27 is therefore hereinafter called tilting axis.

In order to additionally secure the steerable propeller in the approximately vertical operating position, a clamp-like bracket 29 is secured at the stern of the vehicle, which bracket can for example receive the first portion 14 of the steerable propeller. The bracket is therefore semicircularly constructed so that the steerable propeller can descend from the upwardly tilted position into the bracket (compare also FIG. 5). In order to be able to hold the steerable propeller in the bracket, at least one catch 30 is secured in the first portion, behind which catch a latch 31 can be placed, which latch is supported on the bracket by means of a pivot pin 32. If the steerable propeller is present in the bracket and is there clamped with the latch, a backward driving is possible. Without such latch the steerable propeller would tilt when reversely driven.

For effecting the tilting movement, a pin 52 is provided at least on one flange 19, on which pin a hinged element 33 is supported. A pulling means 34, for example a chain or a rope, is secured on said hinged element, which pulling means can be wound onto a drum 35. The drum is supported on the vehicle by bearing blocks 36. A ratchet wheel 37 is secured on the drum, into which ratchet wheel a pawl 39 loaded by a spring 38, can fall. Backward or downward movement in response to the weight of the steerable propeller can be prevented by this ratchet wheel and the pawl. The drum is driven by a manual lever 40 which can be coupled with the drum by a not illustrated one-way coupling, for example also with pawl and ratchet wheel.

If the latch of the bracket 29 is released, the steerable propeller can be moved from the vertical operating position into the horizontal upwardly tilted position through the drum 35 and the pulling means 34 by reciprocating the handle 40.

In order to relieve the driving means when the propeller unit is in upwardly tilted condition, at least one further latch 41 can be provided on the vehicle, which latch is loaded with a spring 42. This latch can in the horizontal position of the steerable propeller be placed behind at least one tooth 43 which for this purpose is mounted to at least one flange 19.

If the steerable propeller is to be moved from the horizontal upwardly tilted position into the operating position, then the pawl and latch must be released and the steerable propeller can then be lowered.

For this purpose a known, hence not illustrated, brake can be provided which can be combined with the manual lever 40.

An important characteristic of the invention is that the motor 17 for rotating the propeller is fed by the same energy as the blower or blowers 44 of the vehicle. It is assumed hereinafter that only one blower is provided. The same is driven for example by a hydraulic motor 45 which is fed by a pump 46 which in turn is for example driven by the main motor 47 of the vehicle. Pump and hydraulic motor are connected by conduits 48, 49. The storage container, filter, relief valve and all other elements common for a hydraulic mechanism are conventional and hence not illustrated. A known switch-over valve 50 is provided in the conduits 48, 49, to which valve a further conduit 51 is connected which leads to the motor 17 of the propeller. The conduits consist in a conventional manner of inlet and outlet lines. The energy which is used during travel on land for the blower can be directed by the switch-over valve to the motor 17 for rotating the propeller.

Figure 4:
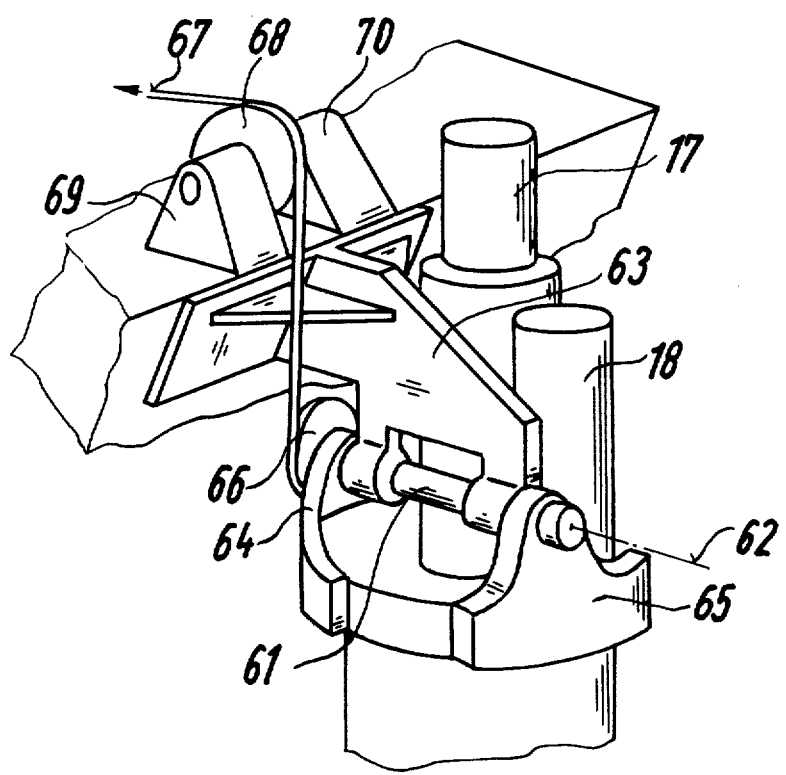
FIG. 4 perspectively illustrates a detail of FIG. 3.

FIG. 3 illustrates schematically a view of the rear of the vehicle on which, as a further exemplary embodiment of the invention, a steerable propeller 60 is supported so that it can tilt transversely to the direction of travel of the vehicle from the vertical operating position into the horizontal position. The steerable propeller consists substantially of the same parts as have been described in connection with FIG. 1. A pivot pin 61 is provided for the tilting movement, the axis 62 of which pin (FIG. 4) lies approximately parallel to the direction of travel. A hinge plate 63 is secured at the rear of the vehicle, which hinge plate fits between two bearing blocks 64, 65 which are secured on the nonpivotable first portion of the steerable propeller. Axial bores extend through the hinge plate and the bearing blocks. Pivot pin 61 is inserted into said bores and in mounted condition can be secured for example by a cotter pin or other means, as has been described in connection with FIG. 2.

Axially with the bores for the bolt 61 a rope sheave 66 is nonrotatably connected to at least one of the bearing blocks (for example 64). A pulling means, for example a rope 67, is secured on the rope sheave. Said rope is guided over a rope sheave 68 which is supported on the vehicle by means of bearing blocks 69, 70. A drive is provided on the free end of the rope, for example as it is described in connection with FIG. 1.

Figure 5:
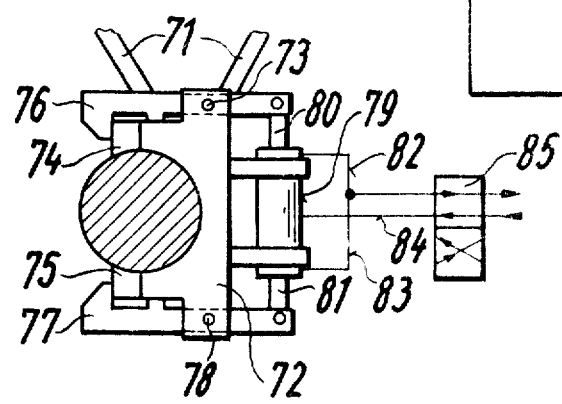
FIG. 5 is a cross-sectional view along the line V-V of FIG. 3.

In order to additionally hold the steerable propeller in the vertical operating position, a clamp-like bracket 72 is secured at the rear of the vehicle by means of braces 71 (FIG. 5). The bracket is recessed semi-circularly so that the steerable propeller is receivable thereinto upon the movement from the horizontal position into the vertical operating position. For fastening into the bracket, the steerable propeller is provided with at least one catch 74, 75 behind which latches 76, 77 can be placed which are rotatably supported on the bracket by pins 78, 73. To operate the latches a cylinder 79 is secured on the bracket, in which cylinder two not illustrated pistons are guided which in a conventional manner are provided with piston rods 80, 81. The piston rods are hinged in a suitable and conventional manner to the latches. The pistons and the cylinder form two outer chambers into which conduits 82, 83 lead. Furthermore a central chamber is provided between the two pistons, into which central chamber a conduit 84 leads. The mentioned chambers can be fed with pressure means by a not illustrated pump by a switch-over valve 85, namely interchangeably so that the pistons approach one another and thereby open the latches, or so that the pistons are moved apart and close the latches.

Similar remote control power means may be provided for the latch lock 31 shown in FIG. 1 if desired.

The hydraulic operation of the latches is an example. An electrical or mechanical operation is also possible.

The motor 17 and the servomotor 18 can also be driven pneumatically or electrically or can be prime movers. Instead of a manual drive for the upward tilting of the steerable propeller it is also possible to use a suitable electrical, pneumatical or hydraulic drive.

Only one steerable propeller is mentioned in the description of the exemplary embodiments. However, it is also possible according to the invention to provide multiple steerable propellers.

In constructing the amphibious vehicle with treads or chains, the forward drive is accomplished mainly by tread or chain drive; the additional floating drive (steerable propeller) serves then to improve the maneuver characteristics.

The embodiments of the invention in which an exclusive property or privilege is claimed are defined as follows:

1. In an amphibious vehicle having an engine and drivable ground engaging and supporting means and first drive means connected between said engine and said ground engaging and supporting means for effecting a driving movement of said ground engaging and supporting means and, consequently, of said vehicle relative to the ground and drivable propeller means and second drive means therefor for effecting a movement of said vehicle through the water, the improvement comprising wherein said drivable propeller means comprises an upper support means pivotally secured to said vehicle for movement about a substantially horizontal axis and lower support means mounted on said upper support means for movement 360° about a substantially vertical axis thereby defining a steering axis, said lower support means having a propeller rotatably secured thereto for rotation about a substantially horizontal axis, said second drive means including a fluid driven drive motor mounted on said upper support means and coupling means for drivingly coupling the output of said fluid driven drive motor to said propeller, a second drive motor mounted on said upper support means for effecting a selective rotation of said lower support means about said substantially vertical axis through 360° relative to said upper support means, third drive means for driving said upper support means for movement about said substantially horizontal axis to effect a movement of said steering axis between positions of vertical alignment and a raised position, and selective control means comprising blower means for venting the interior of said vehicle and fluid driven drive means therefor, a fluid pump driven by said engine and supplying fluid to said fluid driven drive means and two position valve means for directing fluid from said fluid pump either to said fluid driven drive means or to said fluid driven drive motor.

2. The improved amphibious vehicle according to claim 1, wherein said upper support means comprises an upper support member having flange means thereon having means defining a first hole therethrough, and bearing block means mounted on said vehicle and having means defining a second opening therethrough aligned with said axially aligned first opening in said flange means and bolt means received in said first and second openings thereby defining said pivot axis.

3. The improved amphibious vehicle according to claim 2, wherein the axis of said first and second holes extends transversely of the longitudinal axis of said vehicle.

4. The improved amphibious vehicle according to claim 2, wherein the axis of said first and second holes extends parallel to the longitudinal axis of said vehicle.

5. The improved amphibious vehicle according to claim 1, wherein said third drive means comprises cable means connected to said upper support means and includes drum means mounted on said vehicle connected to said cable means for winding and unwinding said cable means thereonto to effect a movement of said upper support means about said substantially horizontal axis.

6. The improved amphibious vehicle according to claim 5, wherein said drum means is manually driven to wind and unwind said cable means therefrom and includes a rachet and pawl mechanism.

7. The improved amphibious vehicle according to claim 1, wherein said vehicle is a tracked vehicle.

8. The improved amphibious vehicle according to claim 1, wherein said first motor means is a fluid driven motor.

9. The improved amphibious vehicle according to claim 1, wherein said second motor means is a fluid driven motor.

10. The improved amphibious vehicle according to claim 1, including first locking means for locking said upper support means to said vehicle so that said steering axis is in said vertical alignment and second locking means for locking said upper means so that said steering axis is in said raised position.

11. The improved amphibious vehicle according to claim 10, wherein said first locking means includes a movable latch pivotally secured to said vehicle and a catch mounted on said upper support means releasably engaging said latch.

12. The improved amphibious vehicle according to claim 10, wherein said first locking means includes a further movable latch pivotally secured to said vehicle and a further catch mounted on said upper support means releasably engaging said latch.

* * * * *